Oct. 22, 1929.                F. FUCHS                1,732,840
                         WORK HOLDING CHUCK
                         Filed July 23, 1926
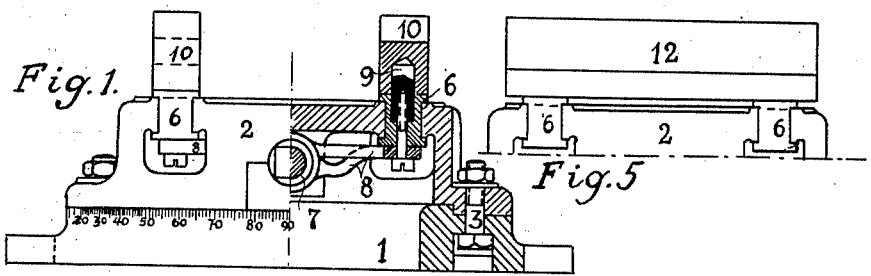
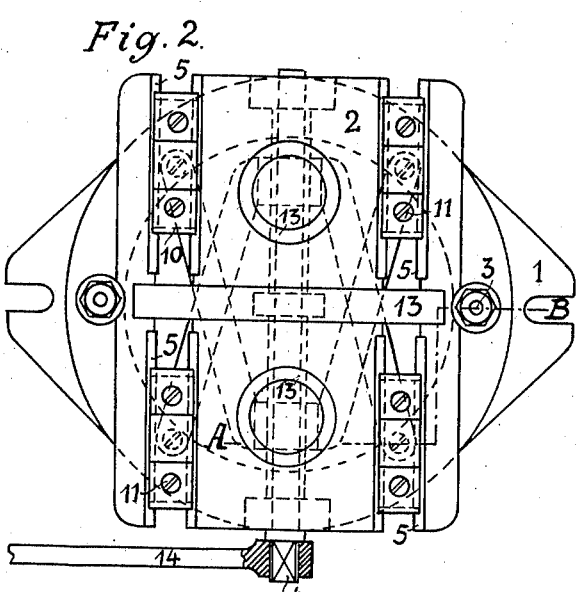
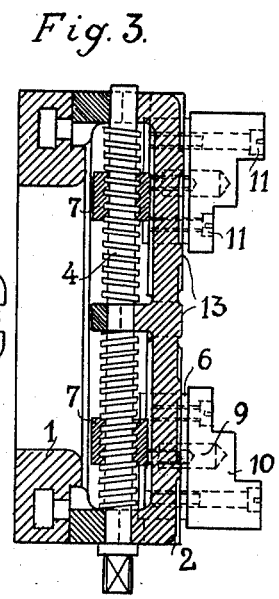
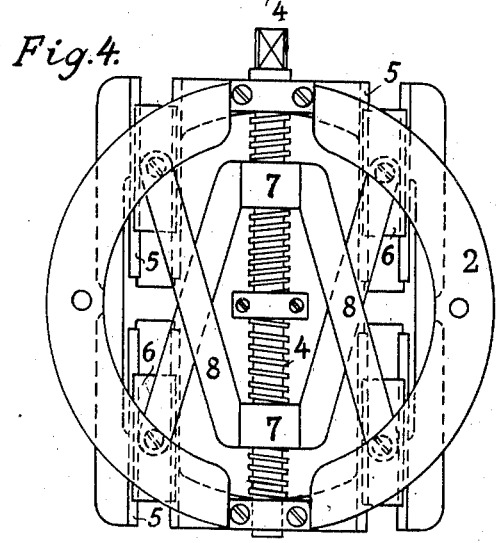
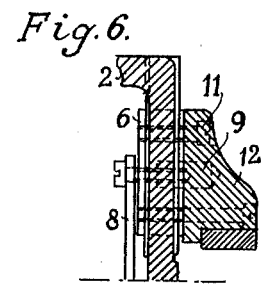
INVENTOR.
Franz Fuchs.
by his ATTORNEY:

Patented Oct. 22, 1929

1,732,840

UNITED STATES PATENT OFFICE

FRANZ FUCHS, OF BADEN, GERMANY

WORK-HOLDING CHUCK

Application filed July 23, 1926, Serial No. 124,487, and in Germany August 8, 1926.

With work holders for planing, shaping, cutting, drilling and like machines, constructed more or less on the same principle as the screw clamps used on the bench, but rotatable, it is frequently difficult accurately to adjust the work, particularly if the work is of iregular shape, one reason being that the jaws do not move uniformly relatively to the axis of rotation, so that when the holder is turned a fresh adjustment has to be made.

The object of my invention is to remove these defects.

According to the invention a rotatable chuck body is provided with two parallel guides for two pairs of slidable jaw carriers, and with a screw spindle having a right hand thread and a left hand thread, and means whereby rotation of the said spindle causes the two pairs of jaw carriers to be moved uniformly towards or away from each other as required. Upon each of the jaw carriers there is mounted a stepped jaw, which may be rotatable so that two faces thereof can be used alternatively. These jaws are preferably removable from the carriers, so that if required two jaws, each extending across the chuck, from one carrier to another, can be substituted for the four jaws.

The device enables castings and the like readily to be chucked, even if of irregular shape. Upon the chuck body, between the jaw carriers, there are preferably seating surfaces enabling the work, facilitating accurate adjustment thereof both in respect of angle and of parallelism with the chuck plane.

An embodiment of the invention is shown in the accompanying drawing, in which:

Fig. 1 is a side view, one half being in section on the broken line A—B of Fig. 2;

Fig. 2 is a top plan view,

Fig. 3 is a cross-section, and

Fig. 4 a bottom plan view with the bottom plate removed.

Fig. 5 shows part of the device, with a jaw of the ordinary type substituted for the jaws shown in Figs. 1, 2 and 3, and Fig. 6 is a cross section thereof.

The bottom plate 1 has an annular seat for the box body 2, which is rotatable and can be fixed in selected position by means of bolts 3, a scale being marked at the rim of the seat to facilitate adjustment. In the box body 2 a screw spindle 4 is mounted, having a right hand thread and a left hand thread. Parallel with the spindle the box body has two slots 5, into each of which two slides 6 are fitted, these slides being movable towards and away from each other. For moving the slides there are two nuts 7 on the spindle, engaged with the right hand thread and the left hand thread respectively, and each of these nuts has two arms 8 connected to two of the slides, the two pairs of arms being crossed and being approximately of V-shape. Upon each slide is a pivot 9 for a stepped jaw 10, the pivots enabling the jaws to be rotated as required for holding the work. The jaws are fixed to the slides by means of screws 11.

Figs. 5 and 6 illustrate the simple manner in which jaws 12 of the ordinary type, extending across the box body, can be fixed to the slides 6.

For accurate angular and parallel adjustment of the work upon the box body 2 the box body has seating surfaces 13.

By rotation of the spindle 4 by means of a key 14 applied thereto the jaws 10 or 12 are moved uniformly towards or away from each other, always in uniform relation to the centre of rotation.

What I claim as my invention and desire to secure by Letters Patent of the United States is:—

1. In a work holding chuck the combination of a box body having two parallel guideways, four slidable jaw carriers, two on each guideway, a screw spindle having a right hand thread and a left hand thread mounted in said box body, and two V-shaped members, each engaged at its apex with one of the screw threads, and each connected by means of its limbs with two of the jaw carriers, the limbs of the two V-shaped members being crossed, the rotation of said spindle serving to move the two jaw carriers on each guideway uniformly towards or away from each other.

2. In a work holding chuck the combination of a box body having two parallel guideways, four slidable jaw carriers, two on each guideway, four separate jaws, one on each carrier, a screw spindle having a right hand thread and a left hand thread mounted in said box body, and means connecting said spindle to said jaw carriers, whereby rotation of said spindle causes the two jaw carriers on each guideway to move uniformly towards or away from each other.

In witness whereof I have signed this specification.

FRANZ FUCHS.